C. F. DAVIS,

Assignor of one-half interest to W. ALLEN.

Grain-Drill.

No. 8,589. Reissued Feb. 18, 1879.

WITNESSES

Franck L. Ouland

Alexander Mahon

INVENTOR

Charles F. Davis, by A. M. Smith

ATTORNEY

UNITED STATES PATENT OFFICE.

CHARLES F. DAVIS, OF AUBURN, NEW YORK, ASSIGNOR OF ONE-HALF INTEREST TO WM. ALLEN, OF SAME PLACE.

IMPROVEMENT IN GRAIN-DRILLS.

Specification forming part of Letters Patent No. 74,515, dated February 18, 1868; Reissue No. 8,589, dated February 18, 1879; application filed January 24, 1879.

*To all whom it may concern:*

Be it known that I, CHARLES F. DAVIS, of Auburn, county of Cayuga, State of New York, have invented certain new and useful Improvements in Grain-Drills, of which the following is a full, clear, and exact description, reference being had to the accompanying drawings, making part of this specification, in which—

Figure 1:
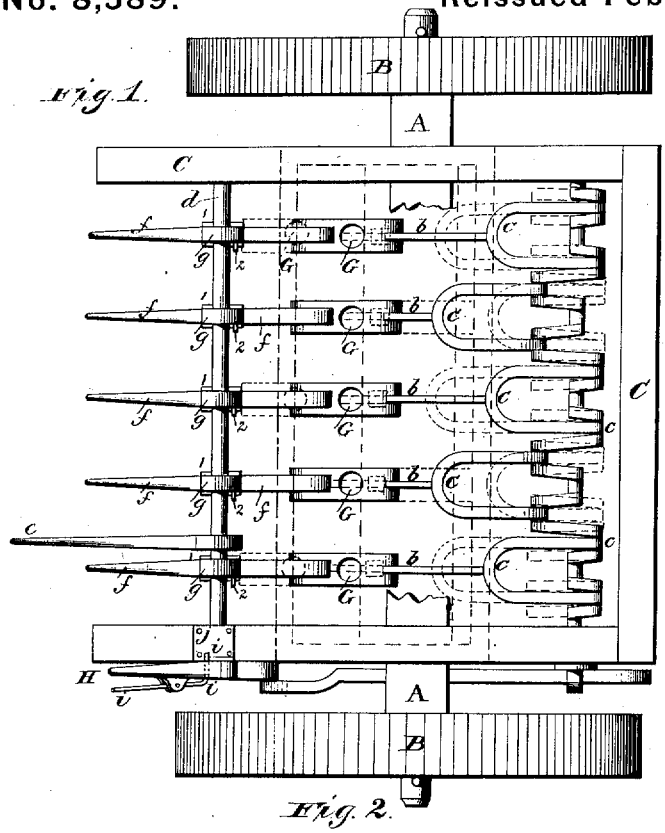
Figure 2:
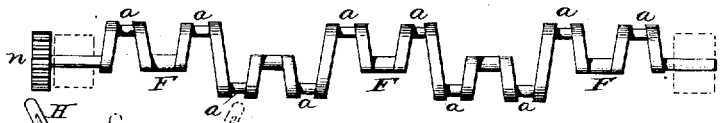
Figure 3:
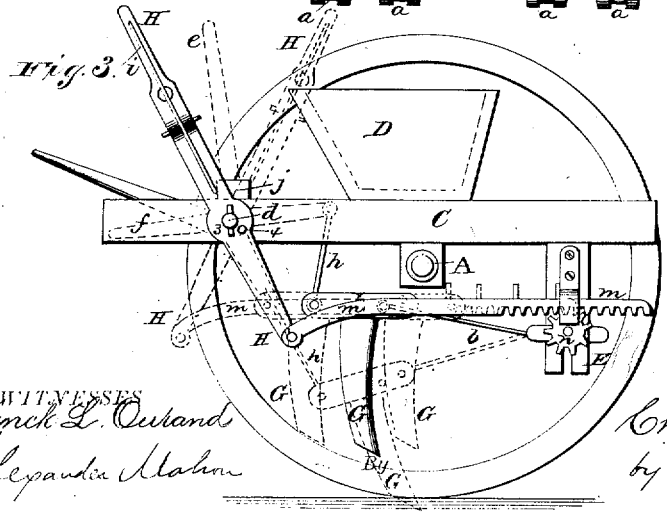

Figure 1 represents a plan or top view of the drill with the seed-box removed (but its position shown by dotted lines) to show the parts underneath it. Fig. 2 represents the crank rod or shaft to which the front ends of the drag-bars are attached; detached from the machine. Fig. 3 represents an end view of the drill, with the wheel removed to show the parts behind it, and representing by full and dotted lines the several operative parts and their positions under the changes of the machine or its parts.

Similar letters of reference denote corresponding parts in all the figures.

The object and purpose of my invention is to shift or change the seeding shoes or hoes from a straight to a zigzag line, and vice versa, and, further, to so hang the shoes or hoes as, in addition to the shifting process, to admit of being raised separately, or the whole series together, as may be found necessary.

To enable others skilled in the art to make and use my invention, I will proceed to describe the same with reference to the drawings.

Upon an axle, A, supported on the usual carrying-wheels B B, is mounted a main frame, C, and on the main frame a seed-box, D, the slides of which may be operated in any of the well-known ways. In bearings E in the front portion of the main frame is hung, so as to rock or turn therein, a zigzag or crank shaft, F, (shown detached in Fig. 2,) and to the crank or wrists *a a a* of this shaft are connected, seriatim, the drag-bars *b b b*, by means of bows or yokes *c*, each bow or yoke taking two of said wrists, as shown in Fig. 1. To the rear ends of these drag-bars *b* are attached the shoes or hoes G, in any of the usual well-known ways.

In the projecting rear portion of the main frame C there is hung a shaft, *d*, upon which there is a lever, *e*, by which it can be rocked or rolled in its bearings. At suitable distances upon this shaft *d* there is placed a series of levers, *f f*, one for each shoe or hoe, which are kept in their proper positions on the shaft by pins 1 1 or other suitable devices, but which can be moved independent of the shaft or of each other, or all together, as will be explained. The levers *f* have a hub or swell, *g*, at their central portions, where they are slipped onto the shaft *d*, and into each one of these hubs is set a pin, 2, which is above the pins 1 1 in the shaft, so that each lever can be turned upon the shaft; but when the shaft is rocked or turned, then all the levers are worked simultaneously. To the forward ends of these levers *f* the shoes or hoes are respectively connected by a link or hinged rod, *h*, the rearward-projecting ends of said levers serving as handles for the operator to seize and work separately when necessary to do so, or he can raise the whole series by seizing and working the lever *e*. One end of the shaft *d* projects through the timber of the main frame for convenience of placing the parts, and upon it is a lever, H, and a spring locking-lever, *i*, connected with it, both of which levers the operator may grasp at once, and by pressure first unlock the catch and then move the main lever H and the shaft *d*, as well as the parts connected with it. The catch or locking lever *i* takes into or against the stop-plate *j* on the main frame when not otherwise controlled. The upper portion of the lever H serves as a handle to work it by, and to the lower end of it is pivoted a rack-bar or connecting-rod, *m*, which takes into a pinion, *n*, fastened on the end of the crank or zigzag shaft F, and when the pinion end is turned the crank-shaft is also turned, and as it is turned it shifts the shoes or hoes into a zigzag or a straight line, as the case may be.

When the lever H and the zigzag shaft F and the connecting-bar *m* and their several connected and operative parts are in the positions shown by the full lines in Figs. 1 and 3, the shoes or hoes G are then in a straight line across the machine; but when the lever H is shifted into the position shown by the dotted lines in Fig. 3, it turns the shaft and moves the parts connected with them, and the shoes or hoes will then stand in a zigzag line across the machine, as shown by the full lines, or in what may be termed two lines, one in advance of the other; and in order that the shoes or hoes may be thus moved into one or two lines, and still be susceptible of being raised up separately, or in their series capacity, their connections and the attachments must all be hinged or yielding. When there is an odd number of shoes or hoes on the machine, the odd one should be in the rear series, in which case there would be no necessity of locking the lever H when the shoes are so arranged, as the greater resistance on the greater number would always keep them so; but if an even number of shoes be used, and an equal number in each row, then the lever would have to be locked or fastened in both of its positions.

It is obvious that other mechanical devices may be used for shifting the shoes or hoes from a straight into a zigzag line, or vice versa.

I have devised several ways of accomplishing this movement. The rack-bar or connecting-bar *m* may be used for this purpose, and thereby the shoes or hoes may be shifted from a straight to a zigzag line, or vice versa, said connecting-bar *m* being held in position, if desired, by any of the usual mechanical devices for that purpose; second, by means of a sheave, pulley, or chain-wheel, which may be keyed to the end of the crank-shaft, and to this sheave or wheel a chain may be attached, and passing around it, so that by means thereof the same effect can be attained as by the rack and pinion.

Another plan may be as follows: A crank or cross-arms may be placed on the turning-shaft, and by means of a connecting rod or rods the shaft may be turned by the operator, and the shoes thus thrown into a straight or zigzag line, as may be desired; or, instead of the crank-shaft, the shoes may be united in sets to different bars, which may be straight, both bars being united to cross-bars or heads at their ends.

Now, by shifting the relations of these two bars, and by the means aforesaid, or by the connecting-rod *m*, the operator can shift the shoes or hoes attached to them into the position hereinabove described. When the hoes are set in a zigzag line, as above mentioned, and are in that position raised up, a pin, 3, in the extreme end of the shaft *d* will take against a pin, 4, in the lever H, and thereby shifting the hoes into more nearly a straight line as they rise, or into quite a straight line, depending upon the extent to which they are raised.

Having now described my invention, what I claim as new, and desire to secure by Letters Patent, is—

1. The shoes or hoes of a seed-planter, attached to the main frame, substantially as described, whereby they may be simultaneously shifted from a straight to a zigzag line, or vice versa, by a single movement.

2. The shoes or hoes of a seed-planter, attached to the main frame, substantially as described, in combination with a lever or its equivalent, whereby they can be shifted at the pleasure of the operator from a straight to a zigzag line, or vice versa.

3. The shoes or hoes of a seed-planter, attached to the main frame, substantially as described, in combination with a rod or its equivalent, whereby they can be shifted from a straight to a zigzag line, or vice versa.

4. A series of shoes or hoes that are capable of being changed from a straight to a zigzag line, or vice versa, in combination with independent levers connecting said shoes or hoes with the lifting-bar, whereby they can be raised by the operator individually or as a whole, substantially as described.

5. The shoe hinged to both its drag-bar and its individual lever, so that it can be raised or lowered in either of its changed positions by a lever that is permanently located, substantially as described.

6. In combination with a series of shoes or hoes that are capable of being changed by the operator at the rear of the machine from a straight to a zigzag line, or vice versa, a shaft and lifting-lever connected therewith, whereby the whole series can be raised at once by the operator to pass obstructions, substantially as described.

CHAS. F. DAVIS.

Witnesses:
CHAS. O'BRIEN,
A. GOODYEAR.